US006677603B2

(12) United States Patent
Yanagiuchi

(10) Patent No.: US 6,677,603 B2
(45) Date of Patent: Jan. 13, 2004

(54) PAPER SHEET DISCRIMINATING DEVICE

(75) Inventor: Takahiro Yanagiuchi, Hiroshima (JP)

(73) Assignee: Glory Ltd (JP)

( * ) Notice: Subject to any disclaimer, the term of this patent is extended or adjusted under 35 U.S.C. 154(b) by 271 days.

(21) Appl. No.: 09/755,347

(22) Filed: Jan. 5, 2001

(65) Prior Publication Data

US 2001/0008275 A1 Jul. 19, 2001

(30) Foreign Application Priority Data

Jan. 14, 2000 (JP) ....................................... 2000-006692

(51) Int. Cl.[7] ................................................ G01N 21/86
(52) U.S. Cl. ..................................................... 250/559.4
(58) Field of Search ..................... 356/73, 71; 194/207; 382/135; 250/556, 559.44, 339.11, 338.1

(56) References Cited

U.S. PATENT DOCUMENTS 4,559,452 A 12/1985 Igaki et al.
5,889,883 A * 3/1999 Simpkins .................... 382/135

FOREIGN PATENT DOCUMENTS

| | | |
|---|---|---|
| EP | 0 101 115 A1 | 2/1984 |
| EP | 0 413 441 A1 | 2/1991 |
| GB | 2 107 911 A | 5/1983 |

* cited by examiner

*Primary Examiner*—Tu T. Nguyen
(74) *Attorney, Agent, or Firm*—TraskBritt

(57) ABSTRACT

The present invention relates to a paper sheet discriminating device which irradiates lights of two or more wavelengths from a light source and receives transmitting lights which transmit through a paper sheet and performs the discrimination in response to light receiving signals, and the device includes a reference value setting apparatus which adjusts a light emission quantity of the light source and stores the output value of the photo sensor which directly receives light from the light source as an adjustment reference value, and an adjustment apparatus which adjusts the light emission quantity of the light source such that the output value of the photo sensor which directly receive light from the light source is made to agree with the stored adjustment reference value.

7 Claims, 11 Drawing Sheets

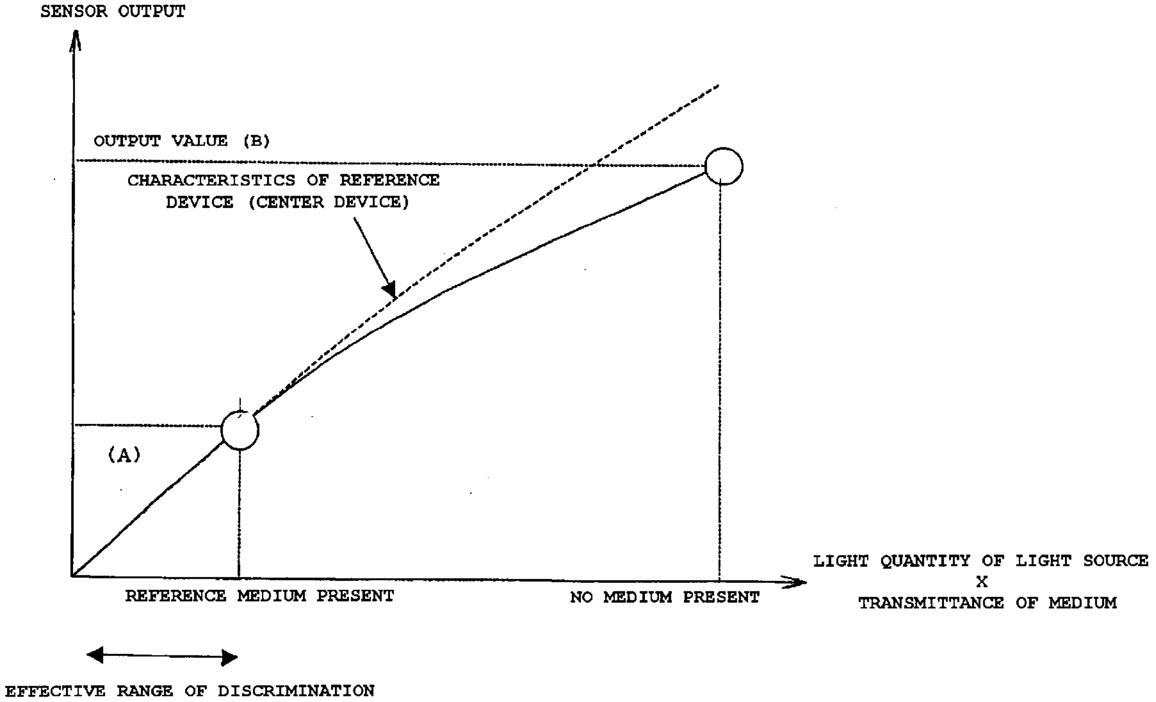
FIG. 12
FIG. 13A
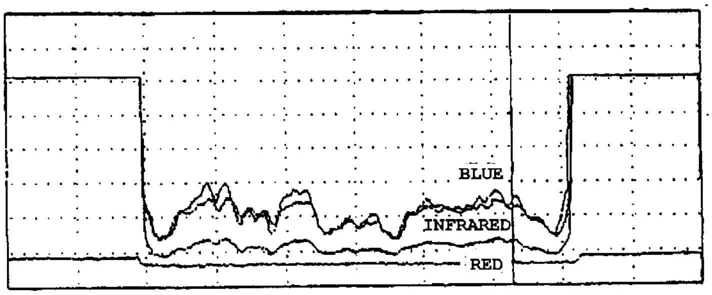
FIG. 13B
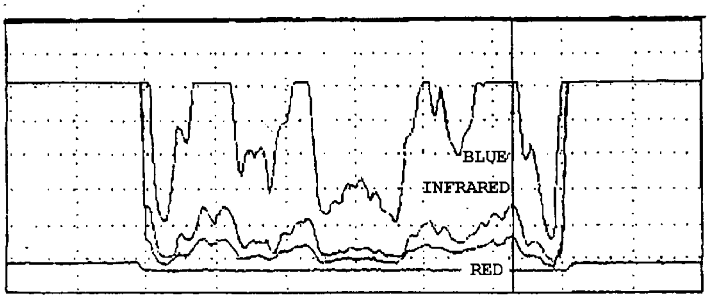

PAPER SHEET DISCRIMINATING DEVICE

BACKGROUND OF THE INVENTION

1. Field of the Invention

The present invention relates to a paper sheet discriminating device which discriminates paper sheets such as bills, stamps, checks, drafts, gift certificates and the like, and more particularly to a paper sheet discriminating device which irradiates lights of at least two wavelengths to the paper sheet and performs the discrimination in response to light receiving signals of transmitting light through the paper sheet and prevents the lowering of the discrimination accuracy due to the irregularities of the outputs of the photo sensor.

2. Description of the Related Art

A conventional paper sheet discriminating device for discriminating paper sheets includes a light source which alternately irradiates lights of two wavelengths (for example, red light and infrared light) to a bill, a photo sensor which receives transmitting lights through a bill as lights intrinsic to respective wavelengths, and a processing discrimination circuit which processes received light signals from the photo sensor and performs the discrimination. In the processing discrimination circuit, since the bill is discriminated by performing the relative evaluation of received light output values between two wavelengths, the received light output levels of the transmitting lights through the bill must be held at given levels at respective wavelengths.

To this end, conventionally, at the time of adjusting the light emission quantity of the light source, first of all, the light emission quantity of the light source is adjusted such that the output values of the photo sensor which receives the direct light from the light source becomes given values. Subsequently, a reference medium is set between the light source and the photo sensor, the ratio of read values (output values) of the photo sensor to the target values (target values/read values) is calculated, and new values obtained by multiplying the ratio to the current given values are stored as light receiving adjustment values. Thus the adjustment of the sensor completes.

FIG. 1 shows the conventional sensor adjustment method using no correction coefficient. First of all, the light quantity is adjusted to the adjustment target value (fixed value) in the state that no bill exists in a passage and thereafter the discrimination of the bill is performed based on the photo sensor output in response to the transporting bill. In such an adjustment method, however, due to the irregularities of the directivity of the light receiving element of the photo sensor, the directivity of the light emitting diode of the light source, the mounting angle and the mounting position of the light receiving element and the light emitting diode, the distance between sensors, the bill passing positions or the like, the characteristics vary in every device. Accordingly, when the output is taken by the photo sensor while transporting the bill, as can be understood from the sensor output in the "bill present" state shown in FIG. 1, the sensor output varies depending on the characteristics curves. This can be said with respect to respective lights of two-wavelength light.

FIGS. 2 and 3 also show the conventional sensor adjustment method. These examples relate to cases where the correction coefficients are stored for respective devices. First of all, the storing procedure of the correction coefficient at the time of shipping is performed as shown in FIG. 2. That is, in the state that no bill is present in a passage, the light quantity is adjusted to the target value A, a white reference medium is set on the photo sensor, and an adjustment target value D of every time is obtained in accordance with a following equation (1) based on an output value B at the point of time and an output value C of the reference device (central device) and is stored in a memory.

$$D=A\times C\div B \quad (1)$$

Subsequently, the adjustment for every judgement at the point of time of discrimination is performed in accordance with FIG. 3. First of all, the light quantity is adjusted such that the light quantity becomes the target value D stored in the memory in the state that no bill exists in the passage, and thereafter, in accordance with the characteristics at the point of time (solid line in FIG. 3), the judgement is performed based on the sensor output in response to the transporting bill. However, in this case, as indicated by the "reference medium present" state in FIG. 3, it also gives rise to the difference in the sensor output (B', C') between the characteristics of the reference device and the characteristics of the actually operating device (broken line). This can be said with respect to respective lights of two-wavelength light source.

As mentioned above, since there exists the irregularities in every device in case the sensor adjustment method has no correction coefficient, there has been a drawback that the sensor output differs in every device. Further, in case of storing the correction coefficient of every device, the light emission quantity of the light source whose characteristics are not linear is adjusted by preliminarily determined computing values. Accordingly, due to the irregularities of the characteristics of the light source which differ in every wavelength and the characteristics of the photo sensor, the mounting error of the light source and the photo sensor, the fluctuation of temperature, the change which occurs as time lapses, the irregularities of circuits or the like, a given output level of the photo sensor with respect to the reference medium varies due to the difference of device. Further, it also gives rise to the difference in the output level of the photo sensor between two wavelengths. Accordingly, the highly accurate discrimination (detection of forged paper sheet) using the received-light output value between the two-wavelengths has been difficult.

SUMMARY OF THE INVENTION

The present invention has been made in view of the above and it is an object of the present invention to provide a paper sheet discriminating device which can perform the highly accurate paper sheet discrimination by making respective output levels of a photo sensor for lights of at least two or more wavelengths agree with each other and reducing the irregularities of the output levels of the photo sensor even at individual paper sheet discrimination parts.

The present invention is directed to a paper sheet discriminating device which irradiates lights of at least two or more wavelengths from a light source to a paper sheet and receives transmitting lights which transmit through the paper sheet by a photo sensor and performs the discrimination of the paper sheet in response to light receiving signals from the photo sensor, wherein the above-mentioned object of the present invention is achieved by providing reference value setting means which adjusts a light emission quantity of the light source such that the output of the photo sensor becomes a given value in a state that a reference medium is set between the light source and the photo sensor and also stores the output value of the photo sensor which directly receives light from the light source as an adjustment reference value, and adjustment means which adjusts the light emission quantity of the light source such that the output value of the photo sensor which directly receives light from the light source is made to agree with the stored adjustment reference value.

Further, the above-mentioned object of the present invention is more effectively achieved by commonly using the lights of at least two or more wavelengths as the light source, by providing a light receiving circuit system which is comprised of an amplifying circuit for amplifying output signals from the photo sensor, a gain changeover circuit which changes over output gains, an offset circuit which adjusts an offset and a separation circuit for separating output signals of lights of respective wavelengths, by arranging the light source and the photo sensor in an opposed manner, by making the paper sheet transported between the light source and the photo sensor, providing a pressing mechanism which presses the paper sheet to the light source side to the photo sensor side, and including any one of infrared light, red light and blue light in the lights of at least two wavelengths.

To be more specific, at the time of initially setting the light receiving adjustment reference value of the two-wavelength light source, for example, the white reference medium is set between the two-wavelength light source and the photo sensor and the light emission quantity of the two-wavelength light source is adjusted such that the output of the photo sensor which receives the transmitting light through the reference medium becomes a given value. Then, with this adjusted light emission quantity, an output value of the photo sensor which directly receives light from the light source in the state that the reference medium is removed is stored in a memory as the light receiving adjustment reference value. Such a setting operation is performed sequentially with respect to two wavelengths. Then, right before starting the discrimination, the light emission quantity of the two-wavelength light source is automatically adjusted. This automatic adjustment is performed in the state that all drive mechanisms are stopped so as to eliminate the influence of noises. Further, since the light emission quantity of the two-wavelength light source is adjusted such that the output of the photo sensor which directly receives light is made to agree with the light receiving adjustment reference value stored as the reference value, the output of the photo sensor in response to the transmitting light through the paper sheet becomes the given level at the time of initial setting with respect to both of the two wavelengths whereby the irregularities of the output levels of the photo sensor between two wavelengths can be suppressed.

The paper sheet discriminating device of the present invention alternately turns on lights of two wavelengths from the two-wavelength light source and irradiates the lights to the paper sheet, detects the transmitting lights through the paper sheet with the photo sensor, and performs the judgment of truth or false of the paper sheet in response to detected signals. A diffusion plate is arranged between the two-wavelength light source and the photo sensor and reduces the influence of irregularities of the directivity, the mounting angle and mounting distance of the two-wavelength light source. Further, the photo sensor and the light receiving circuit system for the two wavelength lights are constituted such that they can be formed into a single unit and is commonly used to the two wavelengths and the output signal of the photo sensor is separated into two wavelengths finally and hence, the offset of the output of the photo sensor between two wavelengths derived from the irregularities of the photo sensor or the circuit depending on the devices can be reduced. Further, although a distance for allowing the passing of the paper sheet (transport passage) is formed between the two-wavelength light source and the photo sensor, the paper sheet is pressed to a guide arranged at the two-wavelength light source side by transport belts which are arranged at both sides of the photo sensor so as to make the sensor passing position of the paper sheet (distance between the paper sheet and the photo sensor) constant whereby the irregularities of the output of the photo sensor due to the sensor passing position of the paper sheet can be suppressed.

Due to such a constitution, the output level of the photo sensor to the lights of two wavelengths becomes stable so that the highly accurate discrimination of the paper sheet becomes possible whereby the detection ability of forged paper sheets is enhanced. Further, by adding the blue light to the infrared light and the red light which constitute the lights of two wavelengths in the light source, the detection ability particularly to copied certificates can be enhanced.

BRIEF DESCRIPTION OF THE DRAWINGS

In the accompanying drawings:

FIG. 12 is a view showing an example of characteristics of the photo sensor according to the present invention; and FIGS. 13A and 13B are detection characteristics for explaining the effect of the present invention.

DETAILED DESCRIPTION OF THE PREFERRED EMBODIMENTS

Embodiments of the present invention are explained hereinafter in conjunction with attached drawings.

Figure 1:
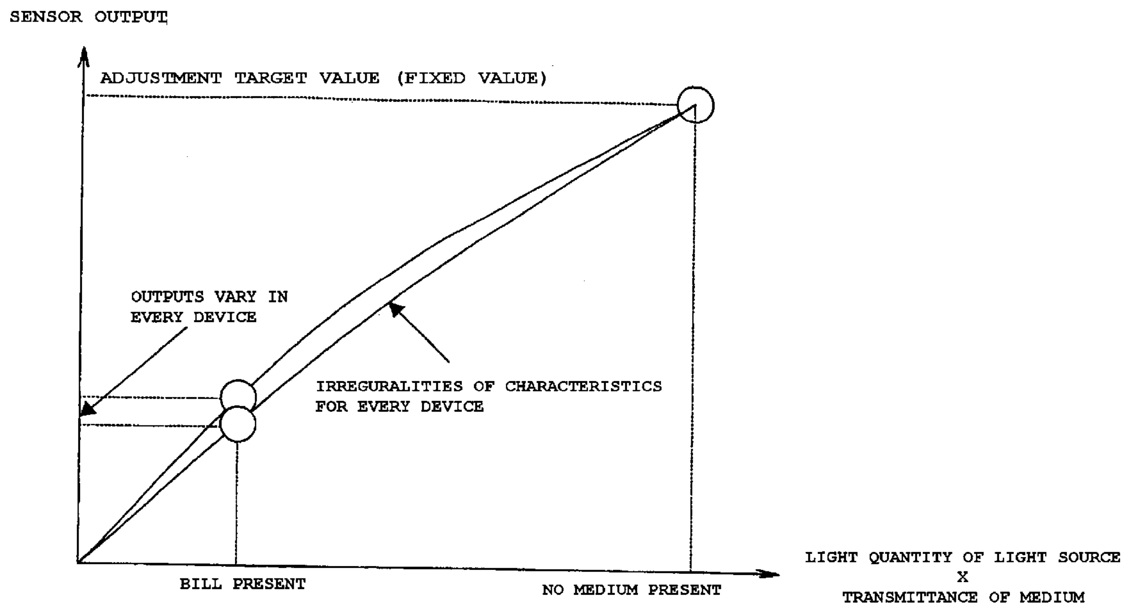
FIG. 1 PRIOR ART
FIG. 1 is characteristics for explaining the conventional adjustment method.
Figure 2:
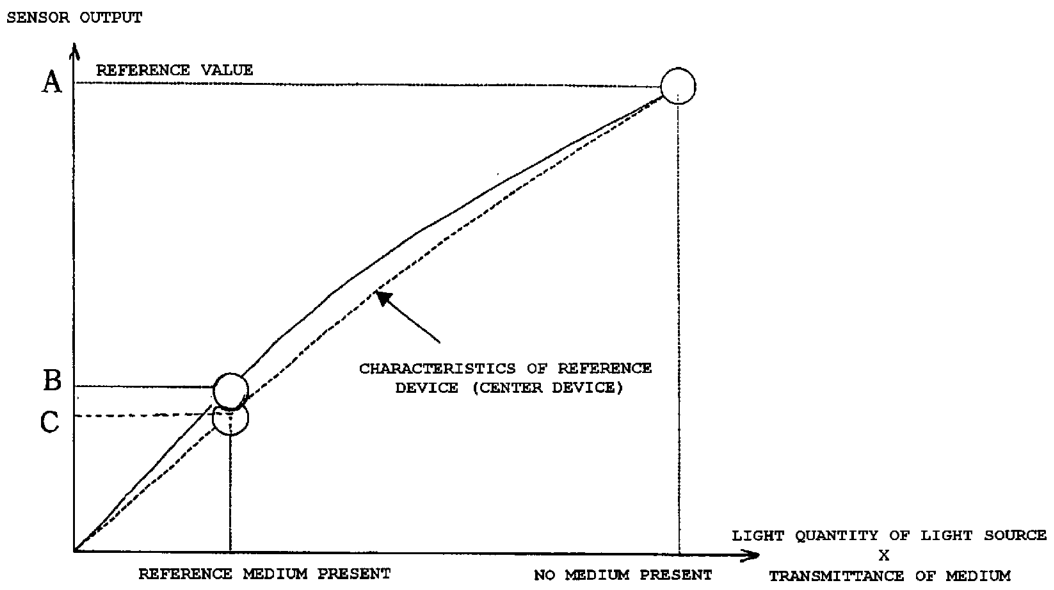
FIG. 2 PRIOR ART
FIG. 2 is characteristics for explaining the conventional adjustment method (storing of correction coefficient)
Figure 3:
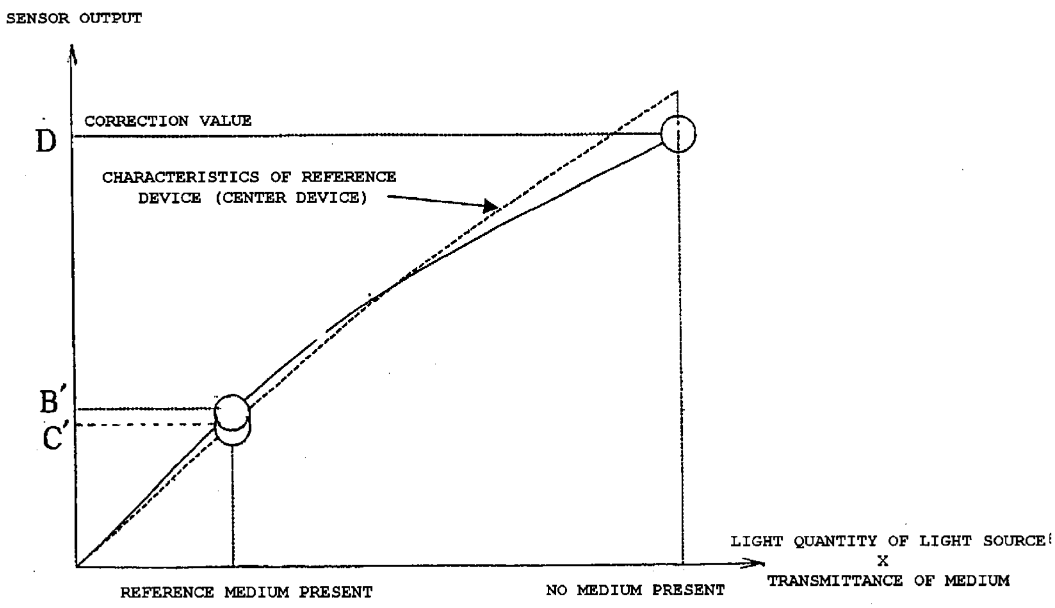
FIG. 3 PRIOR ART
FIG. 3 is characteristics for explaining the conventional adjustment method (photo sensor)
Figure 4:
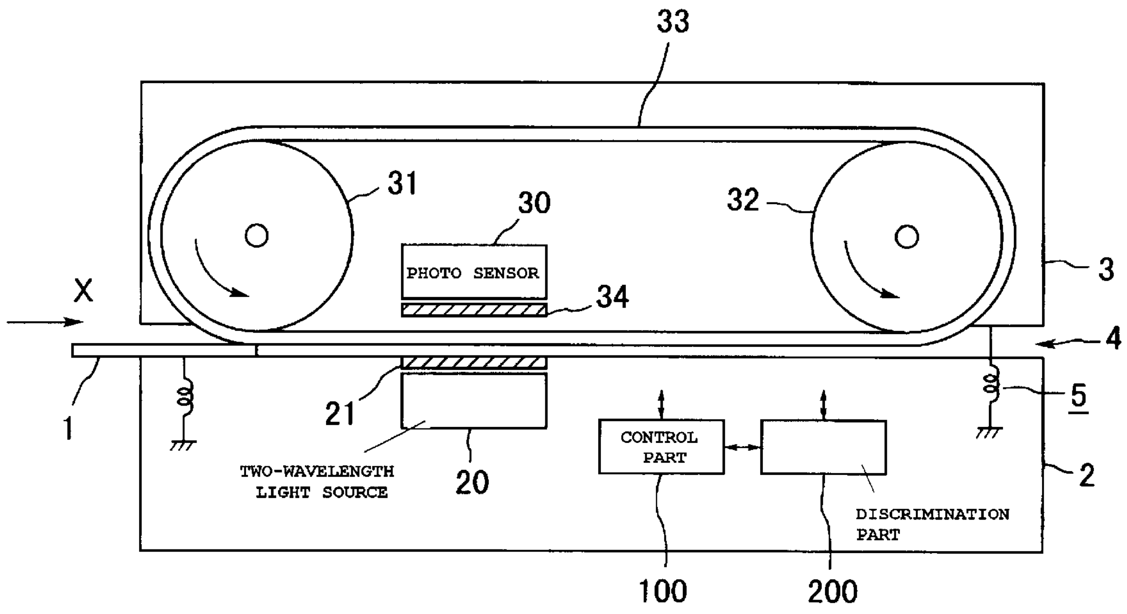
FIG. 4 is a schematic side structural view of a bill discriminating device according to the present invention.

FIG. 4 shows a side structure of a bill discriminating device according to the present invention. A bill 1 is transported in a transport passage 4 defined between a lower-stage unit 2 and an upper-stage unit 3 in an X direction shown in the drawing. The transporting of the bill 1 is performed by means of transport belts 33 which are disposed between and wound around rollers 31 and 32 mounted in the upper-stage unit 3. Two-wavelength light sources 20 and photo sensors 30 are respectively arranged in the lower-stage unit 2 and the upper-stage unit 3 such that they face in an opposed manner while sandwiching the transport passage 4 therebetween. Diffusion plates 34 which diffuse transmitting lights transmitted through the bill 1 are arranged on lower surfaces of the photo sensors 30, while diffusion plates 21 which diffuse irradiating lights are arranged on upper surfaces of the two-wavelength light sources 20. The transport belts 33 are pressed toward the lower-unit 2 side by means of a pressing mechanism 5 which is made of a resilient member such as a spring or the like. Due to the pressing action derived from the pressing mechanism 5, the bill 1 is smoothly transported. Further, a control part 100 (or upper-stage unit 3) is comprised of a CPU and the like which control the whole device and the discrimination part 200 which discriminates the bill 1 in response to outputs of the photo sensors 30 are provided to the lower-stage unit 2.

Figure 5:
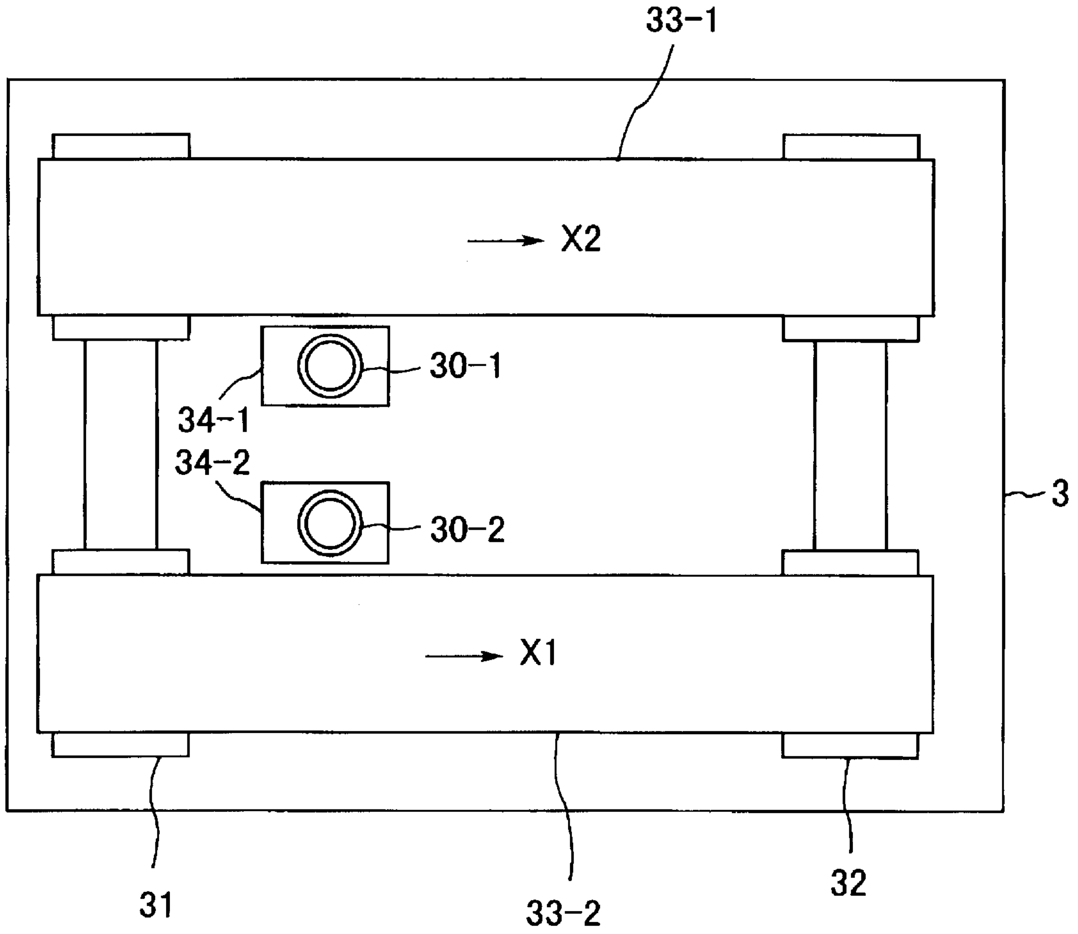
FIG. 5 is a schematic plan structural view of an upper-stage unit of the bill discriminating device.

FIG. 5 is a plan view of the upper-stage unit 3 as seen from a bottom portion thereof. The transport belts 33-1 and 33-2 are respectively wound around both end portions of the rollers 31 and 32. Due to the pressing action of these transport belts 33-1 and 33-2 to the bill 1 and the movement of these transport belts 33-1 and 33-2 in X1 and X2 directions indicated by arrows, the bill 1 which is supplied to the transport passage 4 defined between the upper-stage unit 3 and the lower-stage unit 2 is transported in the X direction. Further, in a space defined between the transport belts 33-1 and 33-2, the two photo sensors 30-1 and 30-2 are arranged in parallel and receive transmitting lights transmitted through the transporting bill 1. The transmitting lights through the bill 1 to which lights diffused by the diffusion plate 21 are irradiated are diffused by the diffusion plate 34 and then received by the photo sensors 30 (30-1, 30-2).

Figure 6:
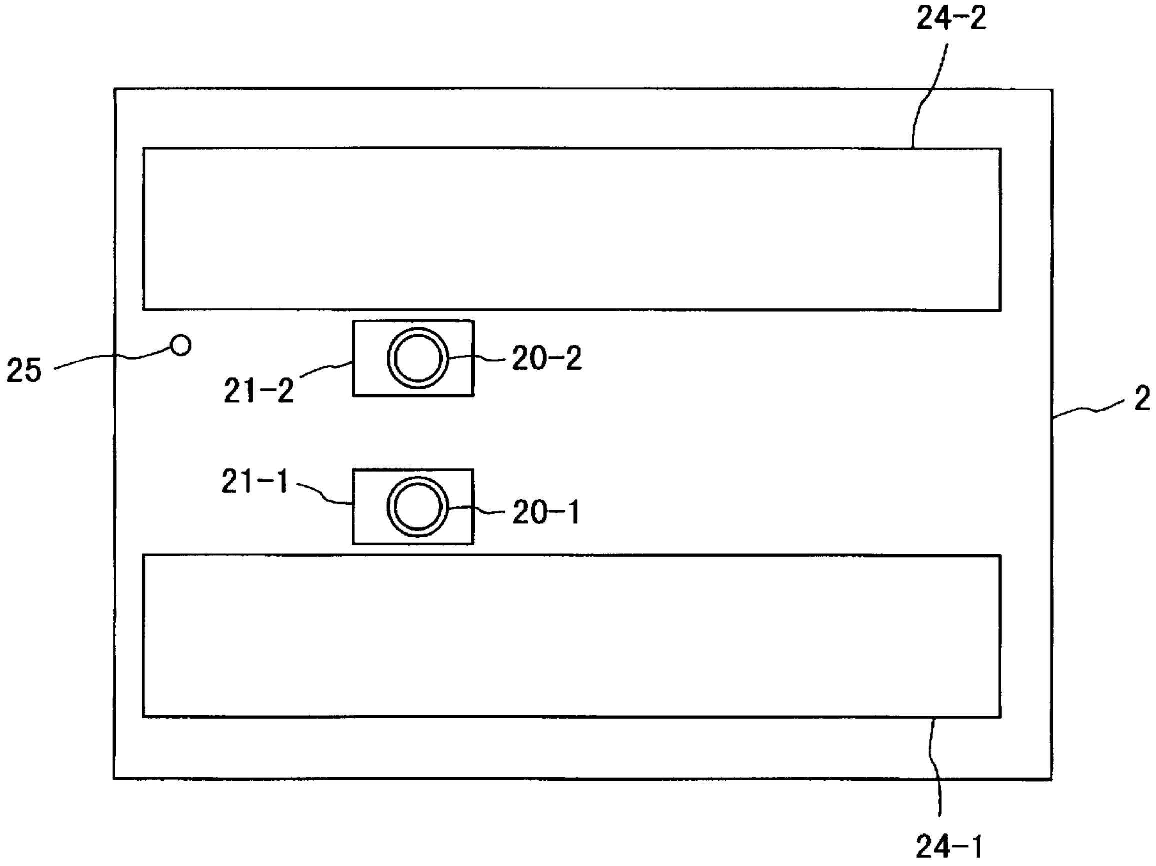
FIG. 6 is a schematic plan structural view of an lower-stage unit of the bill discriminating device.

FIG. 6 is a plan view of the lower-stage unit 2 as seen from an upper portion thereof. Rectangular guides 24-1 and 24-2 are arranged such that they face the transport belts 33-1 and 33-2 in an opposed manner and two-wavelength light sources 20-1 and 20-2 are arranged such that they face the photo sensors 30-1 and 30-2 in an opposed manner. The guides 24-1 and 24-2 are made of metal or synthetic resin and their surfaces are smoothly finished so as to ensure the smooth transporting of the bill 1 which is sandwiched between the transport belts 33-1 and 33-2. Further, diffusion plates 21-1 and 21-2 are respectively arranged on upper surfaces of the two-wavelength light sources 20-1 and 20-2. The two-wavelength light source 20-1 includes a red light and an infrared light LED, while the two-wavelength light source 20-2 includes a blue light and an infrared light LED. Accordingly, the photo sensor 30-1 receives two color transmitting lights from the red light and the infrared light LED of the two-wavelength light source 20-1, while the photo sensor 30-2 receives two color transmitting lights from the blue light and the infrared light LED of the two-wavelength light source 20-2. Further, a bill passing sensor 25 is provided to an insertion part of the bill 1 and the passing and the insertion of the bill 1 is detected by this bill passing sensor 25.

Figure 7:
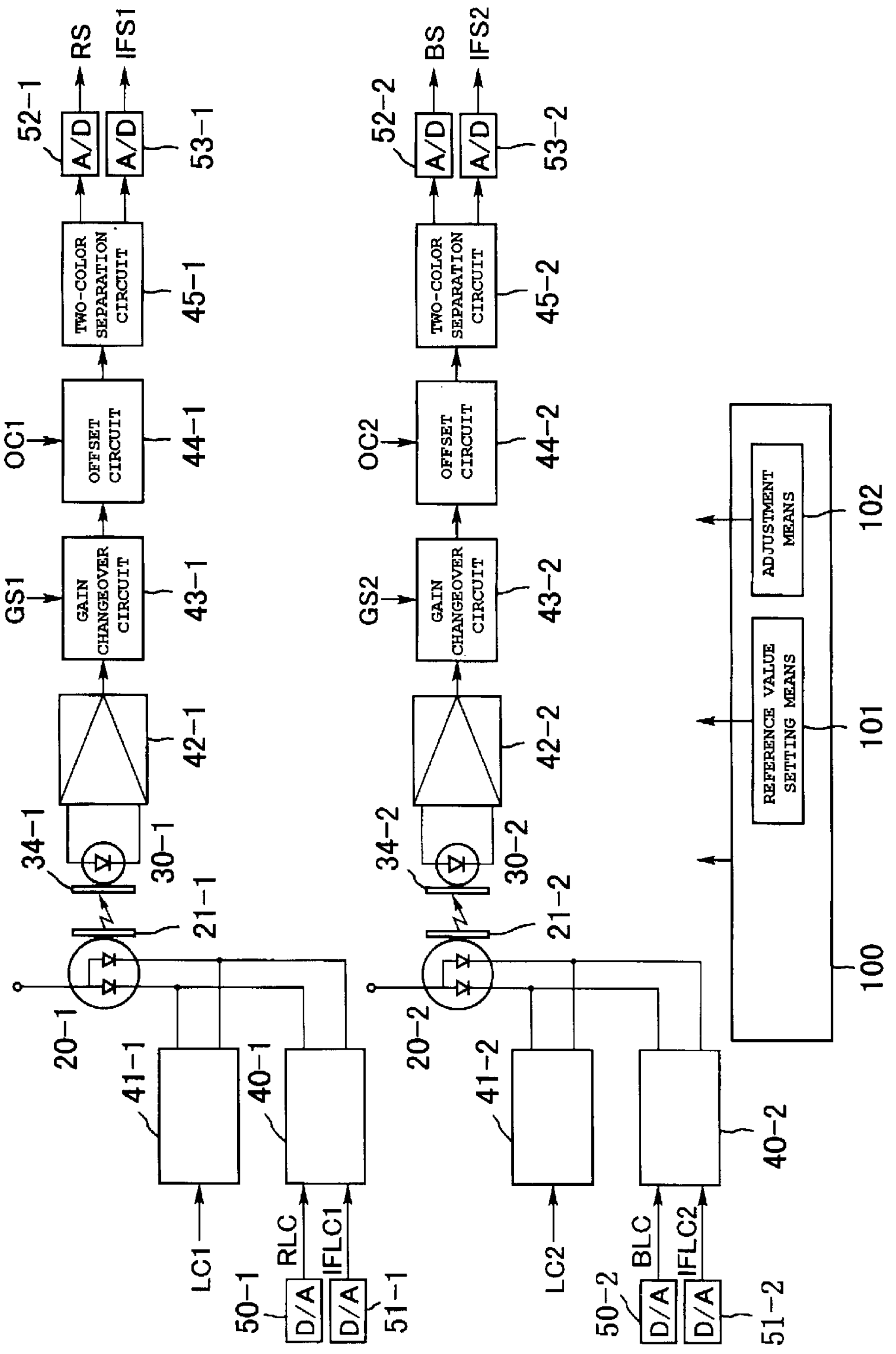
FIG. 7 is a block diagram showing an example of a circuit configuration of the present invention.

FIG. 7 shows an example of circuit configuration as a whole. The two-wavelength light source 20-1 has the light emitting quantity and the lighting (ON)/extinguishing (OFF) thereof controlled by a light quantity control circuit 40-1 and an alternating lighting circuit 41-1. The lights irradiated from the two-wavelength light source 20-1 are received by the photo sensor 30-1 through the light diffusion plates 21-1 and 34-1 and are inputted to a gain changeover circuit 43-1 through an amplifying circuit 42-1. A red light quantity signal RLC and an infrared light quantity signal IFLC1 are respectively inputted to the light quantity control circuit 40-1 through D/A converters 50-1 and 51-1. A lighting control signal LC1 for lighting (ON)/extinguishing (OFF) is inputted to the alternating lighting circuit 41-1. A gain changeover signal GS1 of high level or low level is inputted to the gain changeover circuit 43-1. An output signal from the gain changeover circuit 43-1 is outputted as either a high level signal or a low level signal in response to the inputted gain changeover signal GS1. This signal is inputted to an offset circuit 44-1 which adjusts an offset value. The signal which is subjected to the offset adjustment is further separated into two color signals at a tow-color separation circuit 45-1 which is made of band pass filters. Thereafter, these two color signals are respectively converted into digital values by A/D converters 52-1 and 53-1 and a red light receiving signal RS and an infrared light receiving signal IFS1 are outputted. Further, an offset signal OC1 for adjusting the offset is inputted to the offset circuit 44-1.

Although the above explanation is made with respect to the configuration of the two-wavelength light source 20-1, the same goes for the configuration of the two-wavelength light source 20-2. That is, as to the two-wavelength light source 20-2, the light emitting quantity and the lighting (ON)/extinguishing (OFF) thereof are controlled by a light quantity control circuit 40-2 and an alternating lighting circuit 41-2. The lights irradiated from the two-wavelength light source 20-2 are received by the photo sensor 30-2 through the diffusion plates 21-2 and 34-2 and are converted into a digital quantity by A/D converters 52-2 and 53-2 through an amplifying circuit 42-2, a gain changeover circuit 43-2, an offset circuit 44-2 and a two-color separation circuit 45-2 and are outputted as a blue light receiving signal BS and an infrared light receiving signal IFS2. Further, the blue light quantity signal BLC and the infrared light quantity signal IFLC2 are respectively inputted to the light quantity control circuit 40-2 through D/A converters 50-2 and 51-2, a lighting control signal LC2 is inputted to the alternating lighting circuit 41-2, a gain changeover signal GS2 is inputted to the gain changeover circuit 43-2, and an offset signal OC2 is inputted to the offset circuit 44-2.

The above-mentioned two circuit systems are totally controlled by the control part 100 including the CPU and the like. The control part 100 further includes reference value setting means 101 and adjusting means 102. Since these two circuit systems perform the identical operations, the circuit system of the red light and the infrared light is explained hereinafter.

Figure 8:
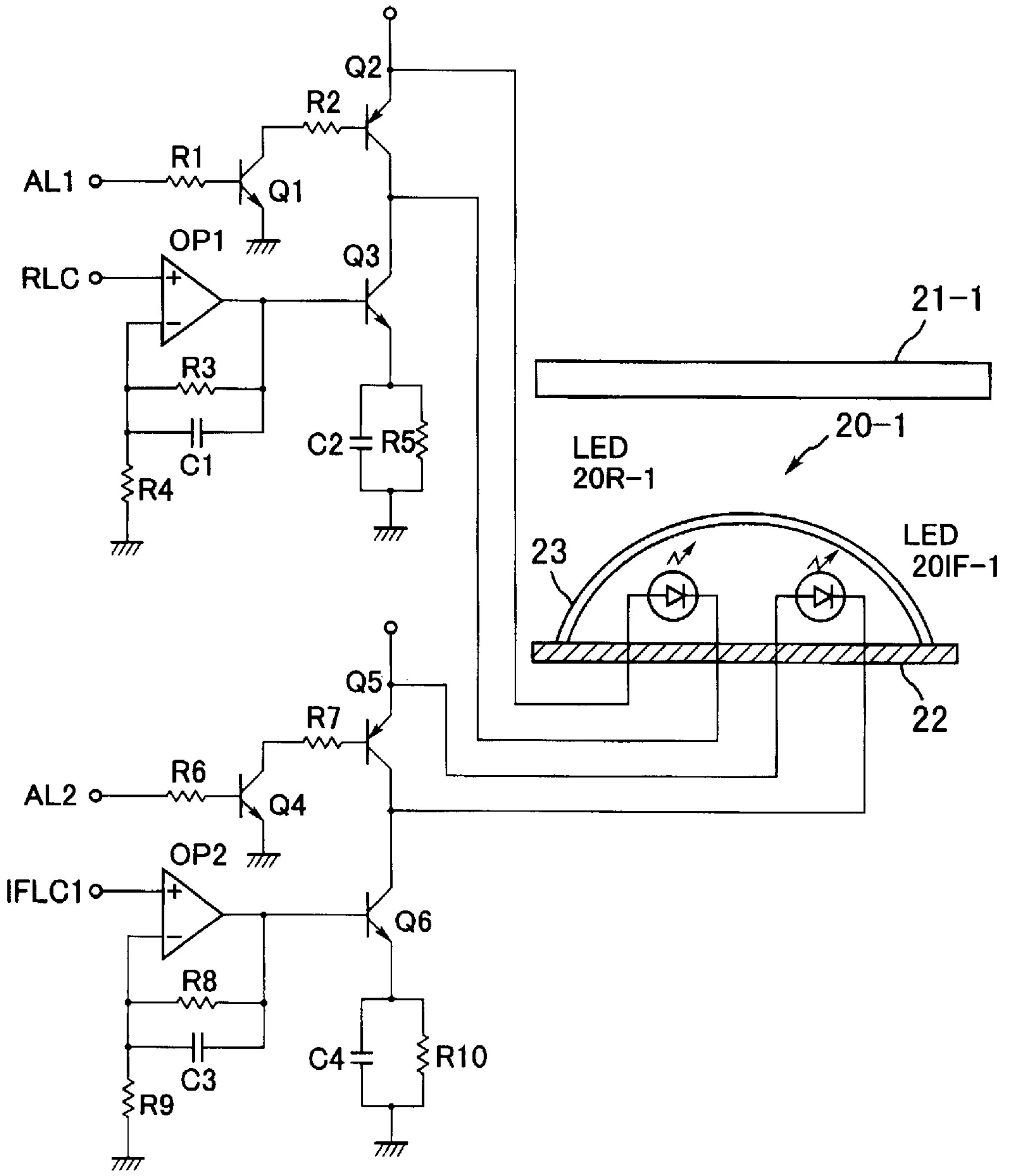
FIG. 8 is a wiring diagram showing an example of a light quantity control circuit of the present invention.

FIG. 8 shows a specific example of a circuit diagram of the light quantity control circuit 40-1 and the two-wavelength light source 20-1. The two-wavelength light source 20-1 has a structure where an LED 20R-1 which emits a red light and an LED 20IF-1 which emits an infrared light are arranged on a circular-plate like substrate 22 and a cover 23 made of a transparent material such as glass spherically covers an upper surface of the substrate 22. The diffusion plate 21-1 is arranged above the cover 23. The LED 20R-1 is connected to a drive transistor Q2 and the LED 20IF-1 is connected to a drive transistor Q5. A base of the transistor Q2 is connected to a switching transistor Q1 to which an alternating signal AL1 is inputted through a resistor R2, while a base of the transistor Q5 is connected to a switching transistor Q4 to which an alternating signal AL2 is inputted through a resistor R7. The alternating signals AL1 and AL2 are supplied from the alternating lighting circuit 41-1 and usually when one is set to "H", the other is set to "L" so as to make either one of the LED 20R-1 and the LED 20IF-1 lit and the other extinguished. In a particular case, both of them may be turned off or extinguished at the same time.

The red light quantity signal RLC is inputted to an operational amplifier OP1 and is amplified and is subjected to the impedance conversion and then is inputted into a base of a transistor Q3, while the infrared light quantity signal IFLC1 is inputted to an operational amplifier OP2 and is amplified and is subjected to the impedance conversion and then is inputted to a base of a transistor Q6 in the same manner. Accordingly, by changing the levels of the red light quantity signal RLC and the infrared light quantity signal IFLC1, the light emitting quantities of the LED 20R-1 and the LED 20IF-1 can be changed. Although the two-wavelength light source 20-1 is explained here, the two-wavelength circuit 20-2 has the same circuit configuration.

Figure 9:
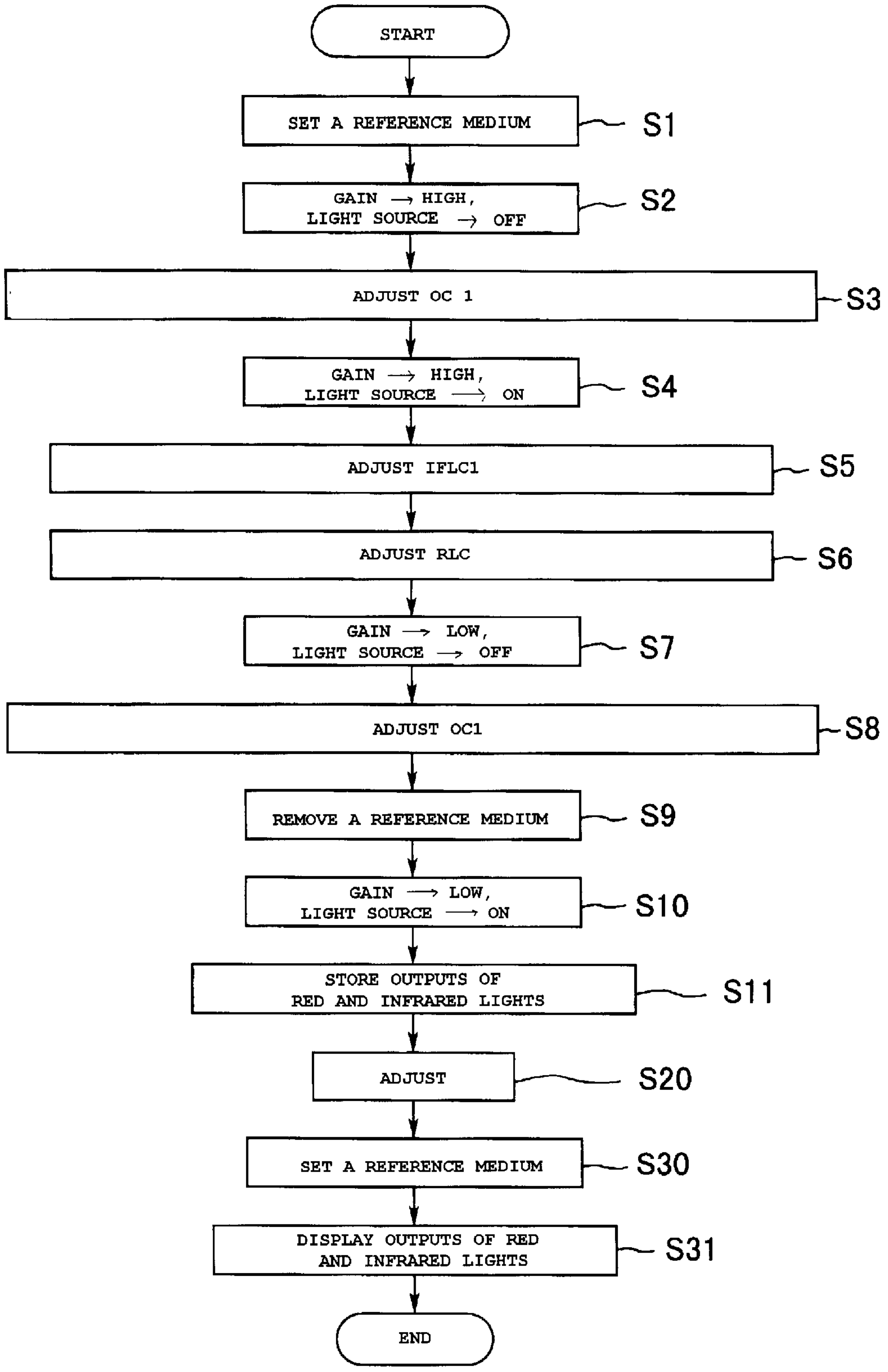
FIG. 9 is a flow chart showing an example of procedure for storing a correction coefficient at the time of shipping according to the present invention.

In such a configuration, an example of manner of operation of the correction coefficient storing procedure at the time of shipping is explained in conjunction with a flow chart shown in FIG. 9. Although this example of manner of operation is explained with respect to the circuit system of the two-wavelength light source 20-1 and the photo sensor 30-1, the same goes for the two-wavelength light source 20-2 and the photo sensor 30-2.

First of all, a white reference medium is set between the two-wavelength light sources (20-1, 20-2) and the photo sensors (30-1, 30-2) in the transport passage 4 (Step S1). The gain signal GS1 to the gain changeover circuit 43-1 is set to the high level and the lighting control signal (extinguishing) LC1 is inputted to the alternating lighting circuit 41-1 to turn off (OFF) the two-wavelength light source 20-1 (Step S2). Under this state, the offset signal OC1 is inputted to the offset circuit 44-1 to make the offset circuit 44-1 perform the offset adjustment such that respective outputs RS and IFS1 of the red light and the infrared light become the offset reference values (Step S3).

Figure 10:
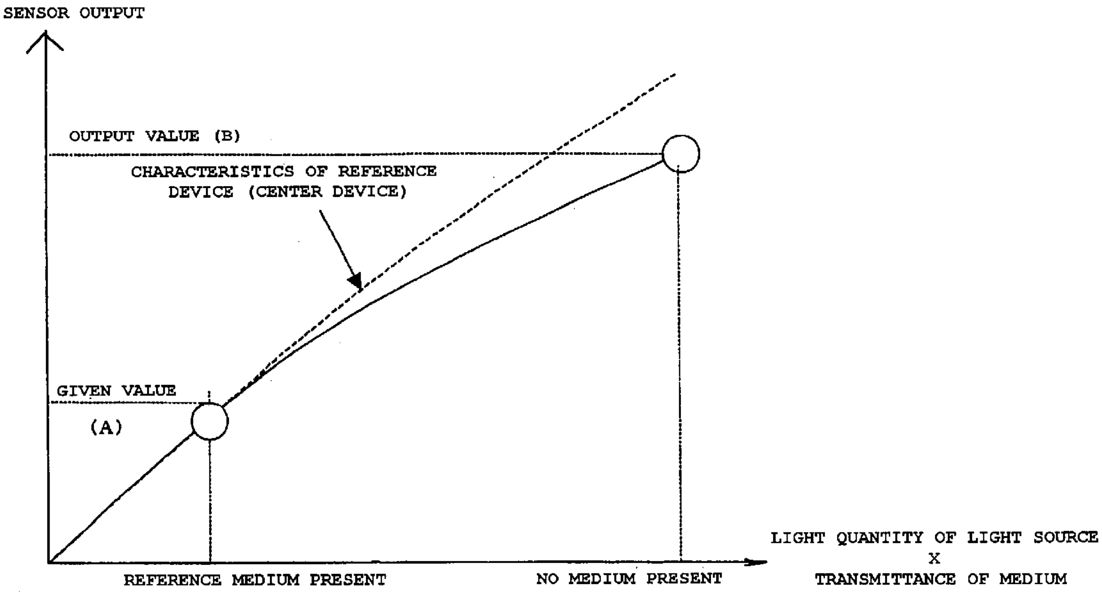
FIG. 10 is characteristics showing the manner of setting the reference value according to the present invention.

Subsequently, while maintaining the gain signal GS1 at the high level, the two-wavelength light source 20-1 is turned on (ON) by inputting the lighting control signal (lighting) LC1 to the alternating lighting circuit 41-1 (Step S4). The infrared light quantity signal IFLC1 is adjusted such that the output RS of the infrared light becomes a first given value A (Step S5) and further the red light quantity signal RLC is adjusted such that the output RS of the red light becomes a given value A as shown in FIG. 10 (Step S6). Then, the gain signal GS1 is set to the low level and the two-wavelength light source 20-1 is turned off (OFF) by inputting the lighting control signal (extinguishing) LC1 to the alternating lighting circuit 41-1 (Step S7).

Thereafter, the offset signal OC1 is inputted to the offset circuit 44-1 to perform the offset adjustment such that respective outputs RS and IFS1 of the red light and the infrared light become the offset reference values (Step S8). The reference medium is removed (Step S9) and the gain signal GS1 is set to the low level and the two-wavelength light source 20-1 is turned on (ON) by inputting the lighting control signal (lighting) LC1 to the alternating lighting circuit 41-1 (Step S10). Under this state, respective outputs RS and IFS1 of the red light and the infrared light expressed as the output values B in FIG. 10 are stored in a memory (not shown in the drawing) (Step S11). Thereafter, the adjustment of the photo sensor 30-1 is adjusted (Step S20). The detail of the adjustment operation is expressed in a flow chart shown in FIG. 11 and will be explained later. After this adjustment, the reference mediums are set to given positions in the transport passage 4 (Step S30) and respective outputs RS and IFS1 of the red light and the infrared light are displayed (Step S31).

Looking at the display of the outputs RS and the IFS1, an operator confirms whether the operation has completed normally or not. Although the outputs should be always the same values under the same conditions, when there exist problems such as the error in set position of the reference medium or stains on the reference medium, the outputs may be deviated from the values.

Figure 11:
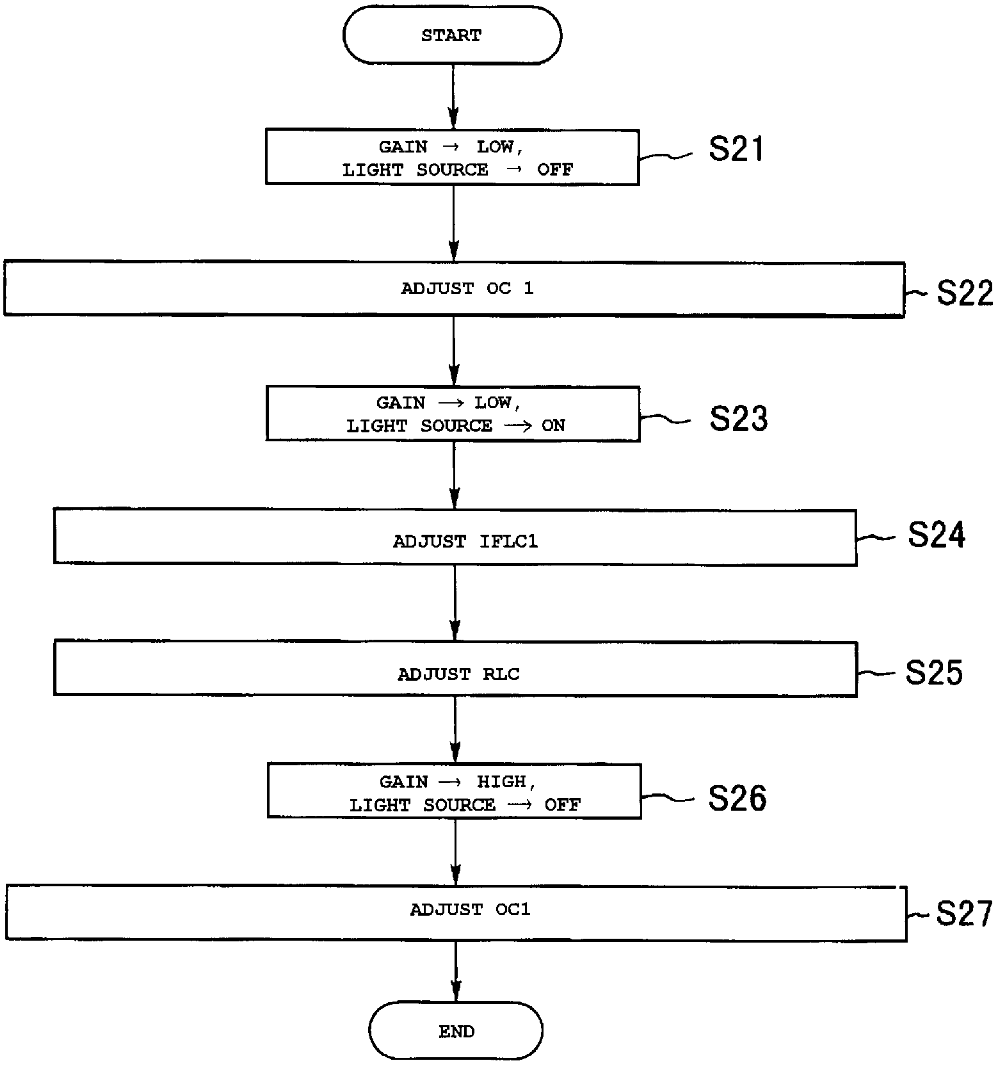
FIG. 11 is a flow chart showing an example of an adjustment of a photo sensor.

On the other hand, the adjustment operation of the photo sensor 30-1 is performed in accordance with the flow chart shown in FIG. 11. First of all, the gain signal GS1 is set to the low level so as to make the gain changeover signal circuit 43-1 output the low level signal and the two-wavelength light source 20-1 is turned off by the alternating lighting circuit 41-1 (Step S21). Under this state, the offset signal OC1 is inputted to the offset circuit 44-1 to make the offset circuit 44-1 perform the offset adjustment such that respective outputs RS and IFS1 of the red light and the infrared light become the offset reference values (Step S22). Thereafter, the two-wavelength light source 20-1 is turned on while maintaining the gain signal GS1 at the low level (Step S23). Then, as shown in FIG. 12, the infrared light quantity signal IFLC1 is adjusted such that the output IFS1 of the infrared light becomes the adjustment reference value B (Step S24) and simultaneously the red light quantity signal RLC is adjusted such that the output RS of the red light becomes the adjustment reference value B (Step S25).

Then, the gain signal GS1 is set to the high level so as to make the gain changeover signal circuit 43-1 output the high level signal and the two-wavelength light source 20-1 is turned off by the alternating lighting circuit 41-1 (Step S26). Thereafter, the offset signal OC1 is inputted to the offset circuit 44-1 to make the offset circuit 44-1 perform the offset adjustment such that respective outputs RS and IFS1 of the red light and the infrared light become the offset reference values (Step S27). Due to such characteristics, the discrimination of the bill can be always performed within the range at the time of transporting paper sheet as shown in FIG. 12.

Although one two-wavelength light source is comprised of the red light and the infrared light and the other two-wavelength light source is comprised of the blue light and the infrared light in this embodiment, it is possible to use light of other wavelength or the combination of lights of other wavelengths. When three color lights are used as the light source, a three color separation circuit is naturally used as the separation circuit. Further, although the explanation has been made with respect to the bills heretofore, the present invention is applicable to other paper sheets such as securities or gift certificates. Further, although the two-color separation circuit is provided in the above-mentioned embodiment, the two-color separation circuit may become unnecessary by performing the A/D conversion in synchronous with the timing to emit lights of respective colors in order.

As has been described heretofore, according to the paper sheet discriminating device of the present invention, since the automatic adjustment of the light emitting quantity of the plural-wavelength light source is performed in the state that all drive mechanisms are stopped, the influence of noises can be eliminated. Further, since the light emitting quantity of the plural-wavelength light source is adjusted such that the light quantity agrees with the prestored light-receiving adjustment reference value, the outputs of the photo sensor become given levels at the time of initial setting with respect to a plurality of wavelengths so that the irregularities of the output levels of the photo sensor among a plurality of wavelengths can be suppressed. Further, since the diffusion plates are respectively arranged between the plural-wavelength light source and the transport passage as well as between the photo sensor and the transport passage, the influence derived from the directivity, the mounting angle and the mounting distance of the light source can be reduced so that only one light receiving element or one light receiving circuit can be commonly used for a plurality of wavelengths. Further, since the output signal of the photo sensor is finally separated into a plurality of wavelengths, the offset of outputs of the photo sensor among a plurality of wavelengths derived from irregularities of the light receiving elements or the circuit due to the difference of devices can be reduced.

Further, since the paper sheet is pressed to the light-source side guide by the belts arranged at both sides of the photo sensors so as to suppress the irregularities of the sensor passing position of the paper sheet (the distance between the paper sheet and the sensors), the irregularities of the outputs of the photo sensor due to the sensor passing position of the paper sheet can be suppressed.

FIG. 13A shows an example of the output of the photo sensor receiving the blue light, the infrared light and the red light which are irradiated to a U.S. 100 dollar bill (true certificate), while FIG. 13B shows an example of the output of the photo sensor receiving the blue light (470±15 nm), the infrared light (890±35 nm) and the red light (660±10 nm) which are irradiated to a black and white copy of U.S. 100 dollar bill (forged certificate). As can be understood from this characteristics example, the large difference exists in the output of the sensor between the true certificate and the forged certificate so that the forged certificate made of the black and white copy can be surely discriminated.

What is claimed is:

1. A paper sheet discriminating device which irradiates lights of at least two or more wavelengths from a light source to a paper sheet and receives transmitting lights which transmit through said paper sheet by a photo sensor and performs the discrimination of said paper sheet in response to received light signals from said photo sensor, wherein the improvement being characterized in that said paper sheet discriminating device further includes reference value setting means which adjusts a light emission quantity of said light source such that the output of said photo sensor becomes a given value in a state that a reference medium is set between said light source and said photo sensor and also stores the output value of said photo sensor which directly receives light without the reference medium from said light source as an adjustment reference value in a memory part, and adjustment means which adjusts the light emission quantity of said light source such that the output value of said photo sensor which directly receives light without the reference medium from said light source is made to agree with the stored adjustment reference value;

wherein lights of at least two or more wavelengths are commonly used as said light source and said paper sheet discriminating device further includes a light receiving circuit system which is comprised of an amplifying circuit for amplifying output signals from the photo sensor, a gain changeover circuit which changes over an output gain, an offset circuit which adjusts an offset and a separation circuit for separating output signals of said lights of respective wavelengths.

2.A paper sheet discriminating device according to claim 1, wherein said two or more wavelengths are two wavelengths of red light and infrared light.

3. A paper sheet discriminating device according to claim 1, wherein said light source includes two-wavelength light source of red light and infrared light and said separation circuit separates red light signal and infrared light signal.

4. A paper sheet discriminating device according to claim 1 further including diffusion plates respectively mounted on said light source and photo sensor.

5. A paper sheet discriminating device according to claim 1 further comprising an additional pair of light source and photo sensor whereby said device includes two light sources and two photo sensors and said light source comprises two-pairs of red and infrared LEDs and blue and infrared LEDs.

6. A paper sheet discriminating device according to claim 1, wherein said light source and said photo sensor are arranged to face each other in an opposed manner such that said paper sheet is transported between said light source and said photo sensor and said paper sheet discriminating device further includes a pressing mechanism which presses said paper sheet to said light source side at said photo sensor side.

7. A paper sheet discriminating device according to claim 1, wherein said lights of at least two or more wavelengths include any one of infrared light, red light and blue light.

* * * * *